(12) United States Patent
Harai et al.

(10) Patent No.: US 11,322,269 B2
(45) Date of Patent: May 3, 2022

(54) ELECTRICALLY CONDUCTIVE FILM

(71) Applicant: ZEON CORPORATION, Tokyo (JP)

(72) Inventors: Kenichi Harai, Tokyo (JP); Satoshi Tazaki, Tokyo (JP); Kazuyuki Obuchi, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 126 days.

(21) Appl. No.: 16/306,655

(22) PCT Filed: Jun. 23, 2017

(86) PCT No.: PCT/JP2017/023271
§ 371 (c)(1),
(2) Date: Dec. 3, 2018

(87) PCT Pub. No.: WO2018/003713
PCT Pub. Date: Jan. 4, 2018

(65) Prior Publication Data
US 2019/0139673 A1 May 9, 2019

(30) Foreign Application Priority Data

Jun. 29, 2016 (JP) .............................. JP2016-128573
Mar. 31, 2017 (JP) .............................. JP2017-071318

(51) Int. Cl.
*H01B 5/14* (2006.01)
*B32B 27/00* (2006.01)
(Continued)

(52) U.S. Cl.
CPC ................ *H01B 5/14* (2013.01); *B32B 25/16* (2013.01); *B32B 27/00* (2013.01); *B32B 27/30* (2013.01);
(Continued)

(58) Field of Classification Search
CPC ........ H01B 3/442; H01B 5/14; C08J 2353/02; C08J 5/18; C08J 7/0427;
(Continued)

(56) References Cited

U.S. PATENT DOCUMENTS

2011/0147668 A1   6/2011  Kim et al.
2013/0244367 A1*  9/2013  Kohara ................ B32B 27/365
                                                  438/64

(Continued)

FOREIGN PATENT DOCUMENTS

CN   103865415 A    6/2014
EP   3093141 A1    11/2016
(Continued)

OTHER PUBLICATIONS

Jan. 1, 2019, International Preliminary Report on Patentability issued in the International Patent Application No. PCT/JP2017/023271.
(Continued)

*Primary Examiner* — Camie S Thompson
(74) *Attorney, Agent, or Firm* — Kenja IP Law PC

(57) ABSTRACT

An electroconductive film including a resin layer and an electroconductive layer, wherein the resin layer has a storage elastic modulus at 25° C. of more than 10 MPa and less than 1,000 MPa, and the electroconductive layer has a surface resistance value of 1,000 Ω/sq. or less.

4 Claims, 2 Drawing Sheets

| (51) | Int. Cl. | |
|---|---|---|
| | C09D 7/65 | (2018.01) |
| | B32B 25/16 | (2006.01) |
| | B32B 27/30 | (2006.01) |
| | C08J 7/04 | (2020.01) |
| | C08J 7/043 | (2020.01) |
| | C08J 7/044 | (2020.01) |
| | C08J 7/046 | (2020.01) |
| | B32B 27/36 | (2006.01) |
| | C08F 297/04 | (2006.01) |
| | C08J 5/18 | (2006.01) |
| | C09D 5/24 | (2006.01) |
| | C09D 165/00 | (2006.01) |
| | H01B 3/44 | (2006.01) |
| | C08K 3/08 | (2006.01) |

(52) U.S. Cl.
CPC .......... *B32B 27/36* (2013.01); *C08F 297/046* (2013.01); *C08J 5/18* (2013.01); *C08J 7/043* (2020.01); *C08J 7/044* (2020.01); *C08J 7/046* (2020.01); *C08J 7/0427* (2020.01); *C09D 5/24* (2013.01); *C09D 7/65* (2018.01); *C09D 165/00* (2013.01); *H01B 3/442* (2013.01); *C08G 2261/1424* (2013.01); *C08G 2261/3223* (2013.01); *C08G 2261/512* (2013.01); *C08G 2261/794* (2013.01); *C08J 2353/02* (2013.01); *C08J 2465/00* (2013.01); *C08K 2003/0806* (2013.01)

(58) Field of Classification Search
CPC ......... C08G 2261/1424; C08F 297/046; C08F 8/04; B32B 25/16; B32B 27/00; B32B 27/30; B32B 7/02; B32B 2255/10; B32B 2255/205; B32B 2307/412; B32B 2250/02; B32B 17/1055; B32B 17/10798; B32B 17/061; B32B 17/10; C08L 25/18; C08L 53/02; C08L 2666/24; C09D 165/00; C09D 153/02; C09J 7/00; C09J 153/025; C09J 153/02; C08C 19/25; Y10T 428/31612; Y10T 428/31633; C08K 5/5425; C08K 5/3475

USPC ....... 428/297.4, 447, 64, 429; 524/128, 110, 524/107, 151, 153; 156/329; 525/88, 525/314, 319

See application file for complete search history.

(56) References Cited

U.S. PATENT DOCUMENTS

| 2014/0159256 A1 | 6/2014 | Choi et al. |
| 2014/0302326 A1 | 10/2014 | Shin et al. |
| 2015/0378461 A1 | 12/2015 | Hashimoto et al. |
| 2017/0058148 A1* | 3/2017 | Ishiguro ................. C09J 153/02 |

FOREIGN PATENT DOCUMENTS

| EP | 3117990 A1 | 1/2017 |
| JP | S55108658 A | 8/1980 |
| JP | S6126649 B2 | 6/1986 |
| JP | 2001260275 A | 9/2001 |
| JP | 2011132527 A | 7/2011 |
| JP | 2011253751 A | 12/2011 |
| JP | 2012067220 A | 4/2012 |
| JP | 2013-249334 | * 12/2013 |
| JP | 2014168886 A | 9/2014 |
| JP | 2017065235 A | 4/2017 |
| KR | 1020130072133 A | 7/2013 |
| WO | 2009151029 A1 | 12/2009 |
| WO | 2015105127 A1 | 7/2015 |
| WO | 2015137376 A1 | 9/2015 |
| WO | 2015178370 A1 | 11/2015 |

OTHER PUBLICATIONS

Sep. 19, 2017, International Search Report issued in the International Patent Application No. PCT/JP2017/023271.

Jan. 19, 2020, Office Action issued by the China National Intellectual Property Administration in the corresponding Chinese Patent Application No. 201780027760.3.

Jul. 15, 2020, Office Action issued by the China National Intellectual Property Administration in the corresponding Chinese Patent Application No. 201780027760.3.

* cited by examiner

ELECTRICALLY CONDUCTIVE FILM

FIELD

The present invention relates to an electroconductive film.

BACKGROUND

As a transparent electroconductive member, there is known an electroconductive glass having an indium oxide thin film formed on a glass plate. However, the electroconductive glass uses glass as a substrate and thus has poor flexibility and processability, which makes it difficult to use the electroconductive glass in some applications. To address this issue, an electroconductive film utilizing a resin has been proposed as a transparent electroconductive member having excellent flexibility and processability (See Patent Literatures 1 and 2).

Further, a technology as disclosed in Patent Literature 3 has been known.

CITATION LIST

Patent Literature

Patent Literature 1: Japanese Patent Application Examined Publication No. Sho. 61-026649 B
Patent Literature 2: Japanese Patent Application Laid-Open No. 2014-168886 A
Patent Literature 1: International Publication No. 2015/178370

SUMMARY

Technical Problem

In recent years, studies on a display device that includes an organic electroluminescent element (hereinafter also referred to as an "organic EL element" as appropriate) have been pursued. The display device that includes the organic EL element is desired to achieve new performance such as foldable and rollable. In order to achieve such performance, there is a demand for developing an electroconductive film having excellent bending resistance while having high electroconductivity.

As an electroconductive film, Patent Literature 1 proposes an electroconductive film that is formed of a styrene-diene-based block copolymer and a thiophene-based copolymer. However, the electroconductive film described in Patent Literature 1 has poor electroconductivity.

Further, as an electroconductive film, Patent Literature 2 proposes a transparent electroconductive film that includes a transparent resin film and an electroconductive layer formed on the transparent resin film. However, the transparent electroconductive film described in Patent Literature 2 has poor bending resistance.

Further, Patent Literature 3 describes an optical film that is formed of a specific hydrogenated product of a block copolymer. Further, Patent Literature 3 describes a transparent electroconductive film as a use application of this optical film. However, Patent Literature 3 does not describe a specific structure of the transparent electroconductive film.

The present invention has been made in view of the aforementioned problems, and an object of the present invention is to provide an electroconductive film having both excellent electroconductivity and excellent bending resistance.

Solution to Problem

As a result of intensive studies to solve the aforementioned problems, the present inventor has found that an electroconductive film having both excellent electroconductivity and excellent bending resistance can be achieved by combining a resin layer having a specific storage elastic modulus at 25° C. with an electroconductive layer having a specific surface resistance value, thereby completing the present invention.

That is, the present invention includes the following aspects.

(1) An electroconductive film comprising a resin layer and an electroconductive layer, wherein
the resin layer has a storage elastic modulus at 25° C. of more than 10 MPa and less than 1,000 MPa, and
the electroconductive layer has a surface resistance value of 1,000 Ω/sq. or less.

(2) The electroconductive film according to (1), wherein the resin layer has a bending elastic modulus at 25° C. of 500 MPa or less.

(3) The electroconductive film according to (1) or (2), wherein
the resin layer contains an alkoxysilyl group-modified product [3] of a hydrogenated product of a block copolymer,
the alkoxysilyl group-modified product [3] is an alkoxysilyl group-modified product of a hydrogenated product [2] that is a product of hydrogenation of carbon-carbon unsaturated bonds in a main chain and a side chain and carbon-carbon unsaturated bonds in an aromatic ring of a block copolymer [1],
the block copolymer [1] includes two or more polymer blocks [A] per one molecule of the block copolymer [1] and one or more polymer blocks [B] per one molecule of the block copolymer [1], the polymer block [A] containing an aromatic vinyl compound unit, the polymer block [B] containing a chain conjugated diene compound unit, and
a ratio (wA/wB) of a weight fraction wA of the polymer blocks [A] in the entire block copolymer [1] and a weight fraction wB of the polymer blocks [B] in the entire block copolymer [1] is in a range of 20/80 to 60/40.

(4) The electroconductive film according to any one of (1) to (3), wherein the electroconductive layer contains at least one type of an electroconductive material selected from the group consisting of a metal, an electroconductive nanowire, and an electroconductive polymer.

Advantageous Effects of Invention

According to the present invention, an electroconductive film having both excellent electroconductivity and excellent bending resistance can be provided.

DESCRIPTION OF EMBODIMENTS

Figure 1:
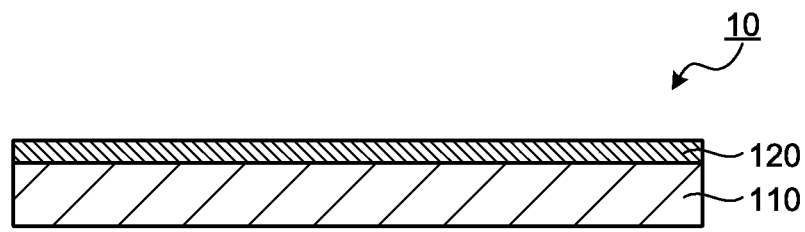
FIG. 1 is a cross-sectional view schematically illustrating an electroconductive film as a first embodiment of the present invention.

Hereinafter, the present invention will be described in detail with reference to embodiments and examples. However, the present invention is not limited to the following embodiments and examples, and may be freely modified for implementation without departing from the scope of claims of the present invention and the scope of their equivalents.

[1. Summary of Electroconductive Film]

The electroconductive film of the present invention includes a resin layer and an electroconductive layer. In addition, the electroconductive film of the present invention may include an optional layer as necessary. However, usually no optional layer is provided between the electroconductive layer and the resin layer, and the electroconductive layer and the resin layer are in direct contact with each other.

[2. Resin Layer]

[2.1. Storage Elastic Modulus of Resin Layer at 25° c.]

The resin layer is a layer formed of a resin and has a storage elastic modulus in a specific range at 25° C. The specific storage elastic modulus of the resin layer at 25° C. is usually more than 10 MPa, preferably more than 15 MPa, and more preferably more than 30 MPa and is usually less than 1,000 MPa, preferably less than 950 MPa, and more preferably less than 900 MPa.

When the storage elastic modulus of the resin layer at 25° C. falls within the aforementioned range, bending resistance of the electroconductive film can be effectively enhanced. Herein, the bending resistance of the electroconductive film means a property that bending of the electroconductive film is less prone to cause lowering of the electroconductivity of the electroconductive layer and appearance change such as whitening. Specifically, when the storage elastic modulus of the resin layer at 25° C. is larger than the lower limit value of the aforementioned range, a change in appearance when the electroconductive film is bent can be prevented from occurring. When the storage elastic modulus of the resin layer at 25° C. is less than the upper limit value of the aforementioned range, a decrease in electroconductivity of the electroconductive layer when the electroconductive film is bent can be suppressed.

The storage elastic modulus of the resin layer may be measured using a dynamic viscoelasticity device under a condition of a frequency of 1 Hz.

[2.2. Resin Contained in Resin Layer]

As the resin contained in the resin layer, a resin containing a polymer and, as necessary, containing an optional component is usually used. As such a polymer, it is preferable to use a specific alkoxysilyl group-modified product [3]. This alkoxysilyl group-modified product [3] is an alkoxysilyl group-modified product of a hydrogenated product [2] obtained by hydrogenating the unsaturated bond of a specific block copolymer [1].

(2.2.1. Block Copolymer [1])

The block copolymer [1] is a block copolymer having two or more polymer blocks [A] per one molecule of the block copolymer [1] and one or more polymer blocks [B] per one molecule of the block copolymer [1].

The polymer block [A] is a polymer block containing an aromatic vinyl compound unit. The aromatic vinyl compound unit is a structural unit having a structure formed by polymerizing an aromatic vinyl compound.

Examples of the aromatic vinyl compound corresponding to the aromatic vinyl compound unit contained in the polymer block [A] may include styrene; styrenes having an alkyl group of 1 to 6 carbon atoms as a substituent such as α-methylstyrene, 2-methylstyrene, 3-methylstyrene, 4-methylstyrene, 2,4-dimethylstyrene, 2,4-diisopropylstyrene, 4-t-butylstyrene, and 5-t-butyl-2-methylstyrene; styrenes having a halogen atom as a substituent such as 4-chlorostyrene, dichlorostyrene, and 4-monofluorostyrene; styrenes having an alkoxy group of 1 to 6 carbon atoms as a substituent such as 4-methoxystyrene; styrenes having an aryl group as a substituent such as 4-phenylstyrene; and vinyl naphthalenes such as 1-vinylnaphthalene and 2-vinylnaphthalene. One type of these may be solely used, and two or more types thereof may also be used in combination at any ratio. Among these, from the viewpoint of lowering hygroscopicity, aromatic vinyl compounds containing no polar group such as styrene and styrenes having an alkyl group of 1 to 6 carbon atoms as a substituent are preferable, and from the viewpoint of industrial availability, styrene is particularly preferable.

The content ratio of the aromatic vinyl compound unit in the polymer block [A] is preferably 90% by weight or more, more preferably 95% by weight or more, and particularly preferably 99% by weight or more. When the polymer block [A] contains such a large amount of the aromatic vinyl compound unit as described above, hardness and heat resistance of the resin layer can be increased.

The polymer block [A] may contain an optional structural unit other than the aromatic vinyl compound unit. The polymer block [A] may solely contain one type of the optional structural unit, and may also contain two or more types thereof in combination at any ratio.

Examples of the optional structural unit that the polymer block [A] may contain may include a chain conjugated diene compound unit. Herein, the chain conjugated diene compound unit refers to a structural unit having a structure formed by polymerizing a chain conjugated diene compound. Examples of the chain conjugated diene compound corresponding to the chain conjugated diene compound unit may include the same examples as those exemplified as the examples of the chain conjugated diene compound corresponding to the chain conjugated diene compound unit that the polymer block [B] contains.

Further, examples of the optional structural unit that the polymer block [A] may contain may include a structural unit having a structure formed by polymerizing an optional unsaturated compound other than the aromatic vinyl compound and the chain conjugated diene compound. Examples of the optional unsaturated compound may include a vinyl compound such as a chain vinyl compound and a cyclic vinyl compound; an unsaturated cyclic acid anhydride; and an unsaturated imide compound. These compounds may have a substituent such as a nitrile group, an alkoxycarbonyl group, a hydroxycarbonyl group, or a halogen group. Among these, from the viewpoint of hygroscopicity, vinyl compounds having no polar group such as chain olefins of 2 to 20 carbon atoms per molecule such as ethylene, propylene, 1-butene, 1-pentene, 1-hexene, 1-heptene, 1-octene, 1-nonene, 1-decene, 1-dodecene, 1-eicosene, 4-methyl-1-pentene, and 4,6-dimethyl-1-heptene; and cyclic olefins of 5 to 20 carbon atoms per molecule such as vinylcyclohexane are preferable. A chain olefin of 2 to 20 carbon atoms per molecule is more preferable, and ethylene and propylene are particularly preferable.

The content ratio of the optional structural unit in the polymer block [A] is preferably 10% by weight or less, more preferably 5% by weight or less, and particularly preferably 1% by weight or less.

The number of the polymer block [A] in one molecule of the block copolymer [1] is preferably 2 or more, and is preferably 5 or less, more preferably 4 or less, and particularly preferably 3 or less. A plurality of polymer blocks [A] in one molecule may be the same as or different from one another.

When a plurality of different polymer blocks [A] are present in one molecule of the block copolymer [1], the weight-average molecular weight of a polymer block having a maximum weight-average molecular weight in the polymer blocks [A] is represented by Mw(A1) and the weight-average molecular weight of a polymer block having a minimum weight-average molecular weight in the polymer blocks [A] is represented by Mw(A2). In this case, a ratio "Mw(A1)/Mw(A2)" of Mw(A1) to Mw(A2) is preferably 4.0 or less, more preferably 3.0 or less, and particularly preferably 2.0 or less. When the ratio is in this range, variation in various property values can be suppressed.

The polymer block [B] is a polymer block containing a chain conjugated diene compound unit. As described above, the chain conjugated diene compound unit refers to a structural unit having a structure formed by polymerizing a chain conjugated diene compound.

Examples of the chain conjugated diene compound corresponding to the chain conjugated diene compound unit of this polymer block [B] may include 1,3-butadiene, isoprene, 2,3-dimethyl-1,3-butadiene, and 1,3-pentadiene. One type of these may be solely used, and two or more types thereof may also be used in combination at any ratio. Among these, a chain conjugated diene compound containing no polar group is preferable, and 1,3-butadiene and isoprene are particularly preferable, because hygroscopicity can be lowered.

The content ratio of the chain conjugated diene compound unit in the polymer block [B] is preferably 70% by weight or more, more preferably 80% by weight or more, and particularly preferably 90% by weight or more. When the polymer block [B] contains such a large amount of the chain conjugated diene compound unit as described above, flexibility of the resin layer can be improved.

The polymer block [B] may contain an optional structural unit other than the chain conjugated diene compound unit. The polymer block [B] may solely contain one type of the optional structural unit, and may also contain two or more types thereof in combination at any ratio.

Examples of the optional structural unit that the polymer block [B] may contain may include an aromatic vinyl compound unit, and a structural unit having a structure formed by polymerizing an optional unsaturated compound other than the aromatic vinyl compound and the chain conjugated diene compound. Examples of the aromatic vinyl compound unit and the structural unit having a structure formed by polymerizing the optional unsaturated compound may include the same examples as those exemplified as the units that the polymer block [A] may contain.

The content ratio of the optional structural unit in the polymer block [B] is preferably 30% by weight or less, more preferably 20% by weight or less, and particularly preferably 10% by weight or less. When the content ratio of the optional structural unit in the polymer block [B] is low, flexibility of the resin layer can be improved.

The number of the polymer block [B] in one molecule of the block copolymer [1] is usually 1 or more, and may be 2 or more. When the number of the polymer block [B] in the block copolymer [1] is 2 or more, the polymer blocks [B] may be the same as or different from one another.

When a plurality of different polymer blocks [B] are present in one molecule of the block copolymer [1], the weight-average molecular weight of a polymer block having a maximum weight-average molecular weight in the polymer blocks [B] is represented by Mw(B1) and the weight-average molecular weight of a polymer block having a minimum weight-average molecular weight in the polymer blocks [B] is represented by Mw(B2). In this case, a ratio "Mw(B1)/Mw(B2)" of Mw(B1) to Mw(B2) is preferably 4.0 or less, more preferably 3.0 or less, and particularly preferably 2.0 or less. When the ratio is in this range, variation in various property values can be suppressed.

The form of the block of the block copolymer [1] may be a chain block or radial block. Among these, a chain block is preferable because of excellent mechanical strength. When the block copolymer [1] has a form of the chain block, the block copolymer [1] having the polymer blocks [A] at both ends of the polymer chain thereof can suppress stickiness of the resin layer to a desired low value, and thus it is preferable.

The particularly preferable form of the block of the block copolymer [1] may include a triblock copolymer represented by [A]-[B]-[A] in which the polymer blocks [A] are bonded to respective ends of the polymer block [B]; and a pentablock copolymer represented by [A]-[B]-[A]-[B]-[A] in which the polymer blocks [B] are bonded to respective ends of the polymer block [A] and polymer blocks [A] are further bonded to respective other ends of the polymer blocks [B]. In particular, a triblock copolymer of [A]-[B]-[A] is especially preferable since the production thereof is easy and properties thereof can be easily controlled to fall within desired ranges.

In the block copolymer [1], a ratio (wA/wB) of a weight fraction wA of the polymer blocks [A] in the entire block copolymer [1] and a weight fraction wB of the polymer blocks [B] in the entire block copolymer [1] falls within a specific range. Specifically, the aforementioned ratio (wA/wB) is usually 20/80 or more, preferably 25/75 or more, more preferably 30/70 or more, and particularly preferably 40/60 or more, and is usually 40/60 or less, and preferably 55/45 or less. When the ratio of wA/wB is equal to or more than the lower limit value of the aforementioned range, hardness and heat resistance of the resin layer can be improved and birefringence thereof can be reduced. When the ratio of wA/wB is equal to or less than the upper limit value of the aforementioned range, flexibility of the resin layer can be improved. Herein, the weight fraction wA of the polymer blocks [A] represents the weight fraction of all of the polymer blocks [A], and the weight fraction wB of the polymer blocks [B] represents the weight fraction of all of the polymer blocks [B].

The weight-average molecular weight (Mw) of the block copolymer [1] is preferably 40,000 or more, more preferably 50,000 or more, and particularly preferably 60,000 or more, and is preferably 200,000 or less, more preferably 150,000 or less, and particularly preferably 100,000 or less.

The molecular weight distribution (Mw/Mn) of the block copolymer [1] is preferably 3 or less, more preferably 2 or less, and particularly preferably 1.5 or less, and is preferably 1.0 or more. Herein, Mn represents the number-average molecular weight.

The weight-average molecular weight (Mw) and the molecular weight distribution (Mw/Mn) of the aforementioned block copolymer [1] may be measured as a polystyrene-equivalent value by gel permeation chromatography (GPC) using tetrahydrofuran (THF) as a solvent.

Examples of the method for producing the block copolymer [1] may include a method of alternately polymerizing a monomer composition (a) containing an aromatic vinyl compound and a monomer composition (b) containing a chain conjugated diene compound by a method such as living anion polymerization or the like; and a method of sequentially polymerizing the monomer composition (a) containing an aromatic vinyl compound and the monomer composition (b) containing a chain conjugated diene compound, and then coupling the ends of the polymer blocks [B] by a coupling agent.

The content amount of the aromatic vinyl compound in the monomer composition (a) is preferably 90% by weight or more, more preferably 95% by weight or more, and particularly preferably 99% by weight or more. The monomer composition (a) may contain an optional monomer component other than the aromatic vinyl compound. Examples of the optional monomer component may include a chain conjugated diene compound and an optional unsaturated compound. The amount of the optional monomer component is preferably 10% by weight or less, more preferably 5% by weight or less, and particularly preferably 1% by weight or less, relative to the monomer composition (a).

The content of the chain conjugated diene compound in the monomer composition (b) is preferably 70% by weight or more, more preferably 80% by weight or more, and particularly preferably 90% by weight or more. The monomer composition (b) may contain an optional monomer component other than the chain conjugated diene compound. Examples of the optional monomer component may include an aromatic vinyl compound and an optional unsaturated compound. The amount of the optional monomer component is preferably 30% by weight or less, more preferably 20% by weight or less, and particularly preferably 10% by weight or less, relative to the monomer composition (b).

Examples of the method for obtaining respective polymer blocks by polymerizing a monomer composition may include radical polymerization, anionic polymerization, cationic polymerization, coordination anionic polymerization, and coordination cationic polymerization. From the viewpoint of facilitating the polymerization operation and the hydrogenation reaction in the later step, a method of performing radical polymerization, anionic polymerization, and cationic polymerization by living polymerization is preferable, and a method of performing polymerization by living anionic polymerization is particularly preferable.

Polymerization may be performed in the presence of a polymerization initiator. When living anionic polymerization is adopted, examples of the polymerization initiator may include monoorganolithium such as n-butyllithium, sec-butyllithium, t-butyllithium, hexyllithium, and phenyllithium; and a polyfunctional organolithium compound such as dilithiomethane, 1,4-dilithiobutane, and 1,4-dilithio-2-ethylcyclohexane. One type of these may be solely used, and two or more types thereof may also be used in combination at any ratio.

The polymerization temperature is preferably 0° C. or higher, more preferably 10° C. or higher, and particularly preferably 20° C. or higher, and is preferably 100° C. or lower, more preferably 80° C. or lower, and particularly preferably 70° C. or lower.

Examples of the system of the polymerization reaction may include solution polymerization and slurry polymerization. Among these, when solution polymerization is used, reaction heat can be easily removed.

When the solution polymerization is performed, an inert solvent that can dissolve polymers obtained in respective steps may be used as the solvent. Examples of the inert solvent may include an aliphatic hydrocarbon solvent such as n-butane, n-pentane, isopentane, n-hexane, n-heptane, and isooctane; an alicyclic hydrocarbon solvent such as cyclopentane, cyclohexane, methylcyclopentane, methylcyclohexane, decalin, bicyclo[4.3.0]nonane, and tricyclo[4.3.0.1$^{2,5}$]decane; and an aromatic hydrocarbon solvent such as benzene and toluene. One type of these may be solely used, and two or more types thereof may also be used in combination at any ratio. Among these, when an alicyclic hydrocarbon solvent is used as a solvent, the alicyclic hydrocarbon solvent as it is can be used also in the hydrogenation reaction as an inert solvent, and the solubility of the block copolymer [1] is favorable, and thus it is preferable. The used amount of the solvent is usually 200 parts by weight to 2,000 parts by weight relative to 100 parts by weight of the total of the used monomers.

When each of the monomer compositions contains two or more types of monomers, a randomizer may be used for preventing a chain of a certain component from being excessively elongated. In particular, when the polymerization reaction is performed by anionic polymerization, it is preferable to use, for example, a Lewis base compound as the randomizer. Examples of the Lewis base compound may include an ether compound such as dimethyl ether, diethyl ether, diisopropyl ether, dibutyl ether, tetrahydrofuran, diphenyl ether, ethylene glycol diethyl ether, and ethylene glycol methyl phenyl ether; a tertiary amine compound such as tetramethyl ethylene diamine, trimethylamine, triethylamine, and pyridine; an alkali metal alkoxide compound such as potassium-t-amyloxide and potassium-t-butyloxide; and a phosphine compound such as triphenyl phosphine. One type of these may be solely used, and two or more types thereof may also be used in combination at any ratio.

(2.2.2. Hydrogenated Product [2])

The hydrogenated product [2] is a polymer obtained by hydrogenating the unsaturated bond in the block copolymer [1]. Herein, the unsaturated bond in the block copolymer [1] to be hydrogenated include all of the carbon-carbon unsaturated bonds in the main chain and in the side chain, and the aromatic and non-aromatic carbon-carbon unsaturated bonds, of the block copolymer [1].

The hydrogenation rate is preferably 90% or more, more preferably 97% or more, and particularly preferably 99% or more of the carbon-carbon unsaturated bonds in the main chain and the side chain and the carbon-carbon unsaturated bonds in the aromatic ring of the block copolymer [1]. As the hydrogenation rate is higher, the transparency, heat resistance, and weather resistance of the resin layer can be made favorable. Furthermore, the birefringence of the resin layer can be easily reduced. Herein, the hydrogenation rate of the hydrogenated product [2] may be determined by $^1$H-NMR measurement.

In particular, the hydrogenation rate of the non-aromatic carbon-carbon unsaturated bond is preferably 95% or more, and more preferably 99% or more. By increasing the hydrogenation rate of the non-aromatic carbon-carbon unsaturated bond, light resistance and oxidation resistance of the resin layer can be further enhanced.

The hydrogenation rate of the aromatic carbon-carbon unsaturated bond is preferably 90% or more, more preferably 93% or more, and particularly preferably 95% or more. By increasing the hydrogenation rate of the carbon-carbon unsaturated bonds in the aromatic ring, the glass transition temperature of the polymer block obtained by hydrogenating the polymer block [A] can be increased, and thus the heat resistance of the resin layer can be effectively enhanced. Furthermore, the photoelastic coefficient of the resin layer can be reduced.

The weight-average molecular weight (Mw) of the hydrogenated product [2] is preferably 40,000 or more, more preferably 50,000 or more, and particularly preferably 60,000 or more, and is preferably 200,000 or less, more preferably 150,000 or less, and particularly preferably 100,000 or less. When the weight-average molecular weight (Mw) of the hydrogenated product [2] falls within the aforementioned range, mechanical strength and heat resistance of the resin layer can be improved. Furthermore, the birefringence of the resin layer can be easily reduced.

The molecular weight distribution (Mw/Mn) of the hydrogenated product [2] is preferably 3 or less, more preferably 2 or less, and particularly preferably 1.5 or less, and is preferably 1.0 or more. When the molecular weight distribution (Mw/Mn) of the hydrogenated product [2] falls within the aforementioned range, mechanical strength and heat resistance of the resin layer can be improved. Furthermore, the birefringence of the resin layer can be easily reduced.

The weight-average molecular weight (Mw) and the molecular weight distribution (Mw/Mn) of the hydrogenated product [2] may be measured as a polystyrene-equivalent value by gel permeation chromatography (GPC) using tetrahydrofuran as a solvent.

The above-mentioned hydrogenated product [2] may be produced by hydrogenating the block copolymer [1]. As a hydrogenation method, a hydrogenation method that can elevate the hydrogenation rate and suppress a chain cleavage reaction of the block copolymer [1] is preferable. Examples of such a hydrogenation method may include the methods described in International Publication No. 2011/096389 and International Publication No. 2012/043708.

Examples of the specific hydrogenation method may include a method of performing hydrogenation using a hydrogenation catalyst containing at least one type of metal selected from the group consisting of nickel, cobalt, iron, rhodium, palladium, platinum, ruthenium, and rhenium. As the hydrogenation catalyst, one type thereof may be solely used, and two or more types thereof may also be used in combination at any ratio. The hydrogenation catalyst may be a heterogeneous catalyst or a homogeneous catalyst. It is preferable to perform the hydrogenation reaction in an organic solvent.

As the heterogeneous catalyst, a metal or a metal compound may be used as it is. Alternatively, it may be used in a form of being supported on a suitable carrier. Examples of the carrier may include activated carbon, silica, alumina, calcium carbonate, titania, magnesia, zirconia, diatomaceous earth, silicon carbide, and calcium fluoride. The amount of the catalyst to be supported on the carrier is preferably 0.1% by weight or more, and more preferably 1% by weight or more, and is preferably 60% by weight or less, and more preferably 50% by weight or less, relative to the total amount of the catalyst and carrier. The specific surface area of the carrier-type catalyst is preferably 100 $m^2$/g to 500 $m^2$/g. The average pore size of the carrier-type catalyst is preferably 100 Å or more, more preferably 200 Å or more, and is preferably 1,000 Å or less, and more preferably 500 Å or less. Herein, the specific surface area may be determined by measuring the adsorbed amount of nitrogen and using the BET formula. The average pore size may be measured by the mercury intrusion technique.

Examples of the homogeneous catalyst may include a catalyst including a compound of nickel, cobalt, or iron in combination with an organometallic compound (for example, organoaluminum compound, orgnanolithium compound); and an organometallic complex catalyst of rhodium, palladium, platinum, ruthenium, rhenium or the like.

Examples of the compound of nickel, cobalt, or iron may include an acetylacetonato compound, a carboxylic acid salt, and a cyclopentadienyl compound of each metal.

Examples of the organoaluminum compound may include alkyl aluminum such as triethyl aluminum and triisobutyl aluminum; halogenated aluminum such as diethyl aluminum chloride and ethyl aluminum dichloride, and hydrogenated alkyl aluminum such as diisobutyl aluminum hydride.

Examples of the organometallic complex catalyst may include a transition metal complex such as dihydride-tetrakis(triphenylphosphine)ruthenium, dihydride-tetrakis(triphenylphosphine)iron, bis(cyclooctadiene)nickel, and bis(cyclopentadienyl)nickel.

The used amount of the hydrogenation catalyst is preferably 0.01 part by weight or more, more preferably 0.05 part by weight or more, and particularly preferably 0.1 part by weight or more, and is preferably 100 parts by weight or less, more preferably 50 parts by weight or less, and particularly preferably 30 parts by weight or less, relative to 100 parts by weight of the block copolymer [1].

The temperature for the hydrogenation reaction is preferably 10° C. or higher, more preferably 50° C. or higher, and particularly preferably 80° C. or higher, and is preferably 250° C. or lower, more preferably 200° C. or lower, and particularly preferably 180° C. or lower. When the hydrogenation reaction is performed within such a temperature range, hydrogenation rate can be increased, and molecular cleavage of the block copolymer [1] can be suppressed.

The hydrogen pressure during the hydrogenation reaction is preferably 0.1 MPa or more, more preferably 1 MPa or more, and particularly preferably 2 MPa or more, and is preferably 30 MPa or less, more preferably 20 MPa or less, and particularly preferably 10 MPa or less. When the hydrogenation reaction is performed at such a hydrogen pressure, hydrogenation rate can be increased, molecular cleavage of the block copolymer [1] can be suppressed, and operability can become favorable.

The hydrogenated product [2] obtained by the above-described method is usually obtained as a reaction liquid containing the hydrogenated product [2], the hydrogenation catalyst, and the polymerization catalyst. Thus, the hydrogenated product [2] may be collected from the reaction liquid after the hydrogenation catalyst and the polymerization catalyst are removed from the reaction liquid by a method such as filtration or centrifugal separation. Examples of the method for collecting the hydrogenated product [2] from the reaction liquid may include a steam coagulation method of removing a solvent from a reaction liquid containing the hydrogenated product [2] by steam stripping; a direct desolvation method of removing a solvent under reduced pressure and heating; and a coagulation method of precipitating or coagulating the hydrogenated product [2] by pouring the reaction liquid into a poor solvent for the hydrogenated product.

The form of the collected hydrogenated product [2] is preferably in a form of pellets so that the hydrogenated product can be easily supplied to the following silylation modification reaction (reaction to introduce an alkoxysilyl group). For example, the hydrogenated product [2] in a molten state is extruded through a die into a strand shape, cooled, and then cut by a pelletizer to form pellets to be supplied to various molding processes. When a coagulation method is used, for example, the resulting coagulated product may be dried and then the product in a molten state may be extruded by an extruder to form pellets in the same manner as described above, to be supplied to various molding processes.

(2.2.3. Alkoxysilyl Group-Modified Product [3])

The alkoxysilyl group-modified product [3] is a polymer obtained by introducing an alkoxysilyl group into the hydrogenated product [2] of the above-described block copolymer [1]. In this case, the alkoxysilyl group may be directly bonded to the above-described hydrogenated product [2] or may be indirectly bonded thereto via a divalent organic group, e.g., an alkylene group. The alkoxysilyl group-modified product [3] into which an alkoxysilyl group has been introduced is particularly excellent in adhesion to an inorganic material such as glass and metal. Thus, the resin layer is usually excellent in adhesion to the aforementioned inorganic material.

The amount of the alkoxysilyl group introduction in the alkoxysilyl group-modified product [3] is preferably 0.1 part by weight or more, more preferably 0.2 part by weight or more, and particularly preferably 0.3 part by weight or more, and is preferably 10 parts by weight or less, more preferably 5 parts by weight or less, and particularly preferably 3 parts by weight or less, relative to 100 parts by weight of the hydrogenated product [2] before the introduction of the alkoxysilyl group. When the amount of the alkoxysilyl group introduction falls within the aforementioned range, the degree of cross-linking between the alkoxysilyl groups decomposed by moisture or the like can be prevented from becoming excessively high, so that the adhesiveness of the resin layer to the inorganic material can be maintained at a high level.

The amount of the alkoxysilyl group introduction may be measured by $^1$H-NMR spectrum. When the introduction amount is small, the measurement of the amount of the alkoxysilyl group introduction may be performed with an increased number of times of integration.

The weight-average molecular weight (Mw) of the alkoxysilyl group-modified product [3] usually does not significantly change from the weight-average molecular weight (Mw) of the hydrogenated product [2] before the alkoxysilyl group is introduced because the amount of alkoxysilyl groups introduced is small. However, when an alkoxysilyl group is introduced, usually the hydrogenated product [2] is modified in the presence of peroxide, so that the crosslinking reaction and the cleavage reaction of the hydrogenated product [2] are proceeded, and the molecular weight distribution tends to change largely. The weight-average molecular weight (Mw) of the alkoxysilyl group-modified product [3] is preferably 40,000 or more, more preferably 50,000 or more, and particularly preferably 60,000 or more, and is preferably 200,000 or less, more preferably 150,000 or less, and particularly preferably 100,000 or less. The molecular weight distribution (Mw/Mn) of the alkoxysilyl group-modified product [3] is preferably 3.5 or less, more preferably 2.5 or less, and particularly preferably 2.0 or less, and is preferably 1.0 or more. When the weight-average molecular weight (Mw) and the molecular weight distribution (Mw/Mn) of the alkoxysilyl group-modified product [3] fall within these ranges, favorable mechanical strength and tensile elongation of the resin layer can be maintained.

The weight-average molecular weight (Mw) and the molecular weight distribution (Mw/Mn) of the alkoxysilyl group-modified product [3] may be measured as a polystyrene-equivalent value by gel permeation chromatography (GPC) using tetrahydrofuran as a solvent.

The alkoxysilyl group-modified product [3] may be produced by introducing an alkoxysilyl group into the hydrogenated product [2] of the above-described block copolymer [1]. As the method for introducing an alkoxysilyl group into the hydrogenated product [2], a method in which the hydrogenated product [2] and an ethylenic unsaturated silane compound are reacted in the presence of a peroxide may be mentioned.

As the ethylenic unsaturated silane compound, those capable of being graft-polymerized with the hydrogenated product [2] resulting in introduction of an alkoxysilyl group into the hydrogenated product [2] may be used. Examples of such an ethylenic unsaturated silane compound may include an alkoxysilane having a vinyl group such as vinyltrimethoxysilane, vinyltriethoxysilane, dimethoxymethylvinylsilane, and diethoxymethylvinylsilane; an alkoxysilane having an allyl group such as allyltrimethoxysilane and allyltriethoxysilane; an alkoxysilane having a p-styryl group such as p-styryltrimethoxysilane and p-styryltriethoxysilane; an alkoxysilane having 3-methacryloxypropyl group such as 3-methacryloxypropyltrimethoxysilane, 3-methacryloxypropylmethyldimethoxysilane, 3-methacryloxypropyltriethoxysilane, and 3-methacryloxypropylmethyldiethoxysilane; an alkoxysilane having a 3-acryloxypropyl group such as 3-acryloxypropyltrimethoxysilane, and 3-acryloxypropyltriethoxysilane; and an alkoxysilane having a 2-norbornene-5-yl group such as 2-norbornen-5-yltrimethoxysilane. Among these, from the viewpoint of easily obtaining the effect of the present invention, vinyltrimethoxysilane, vinyltriethoxysilane, dimethoxymethylvinylsilane, diethoxymethylvinylsilane, allyltrimethoxysilane, allyltriethoxysilane, and p-styryltrimethoxysilane are preferable. As the ethylenic unsaturated silane compound, one type thereof may be solely used, and two or more types thereof may also be used in combination at any ratio.

The amount of the ethylenic unsaturated silane compound is preferably 0.1 part by weight or more, more preferably 0.2 part by weight or more, and particularly preferably 0.3 part by weight or more, and is preferably 10 parts by weight or less, more preferably 5 parts by weight or less, and particularly preferably 3 parts by weight or less, relative to 100 parts by weight of the hydrogenated product [2] before the introduction of the alkoxysilyl group.

As the peroxide, those functioning as a radical reaction initiator may be used. As such a peroxide, an organic peroxide is usually used. Examples of the organic peroxide may include dibenzoyl peroxide, t-butylperoxyacetate, 2,2-di-(t-butylperoxy)butane, t-butylperoxybenzoate, t-butylcumyl peroxide, dicumyl peroxide, di-t-hexyl peroxide, 2,5-dimethyl-2,5-di(t-butylperoxyhexane), di-t-butyl peroxide, 2,5-dimethyl-2,5-di(t-butylperoxy)hexane-3, t-butyl hydroperoxide, t-butylperoxyisobutyrate, lauroyl peroxide, dipropionyl peroxide, and p-menthane hydroperoxide. Among these, those having a 1-minute half-life temperature of 170° C. to 190° C. are preferable. Specifically, t-butylcumyl peroxide, dicumyl peroxide, di-t-hexyl peroxide, 2,5-dimethyl-2,5-di(t-butylperoxyhexane), and di-t-butyl peroxide are preferable. As the peroxide, one type thereof may be solely used, and two or more types thereof may also be used in combination at any ratio.

The amount of the peroxide is preferably 0.01 part by weight or more, more preferably 0.1 part by weight or more, and particularly preferably 0.2 part by weight or more, and is preferably 5 parts by weight or less, more preferably 3 parts by weight or less, and particularly preferably 2 parts by weight or less, relative to 100 parts by weight of the hydrogenated product [2] before the introduction of the alkoxysilyl group.

The method for reacting the hydrogenated product [2] of the block copolymer [1] and the ethylenic unsaturated silane compound in the presence of a peroxide may be performed using, for example, a heat kneading machine and a reaction vessel. As a specific example, a mixture of the hydrogenated product [2], an ethylenic unsaturated silane compound, and a peroxide are heated and melted by using a twin-screw kneader at or higher than the melting temperature of the hydrogenated product [2] to be kneaded for a desired time period. Thereby the alkoxysilyl group-modified product [3] can be obtained. The specific temperature during kneading is preferably 180° C. or higher, more preferably 190° C. or higher, and particularly preferably 200° C. or higher, and is preferably 240° C. or lower, more preferably 230° C. or lower, and particularly preferably 220° C. or lower. The kneading time is preferably 0.1 minute or more, more preferably 0.2 minute or more, and particularly preferably 0.3 minute or more, and is preferably 15 minutes or less, more preferably 10 minutes or less, and particularly preferably 5 minutes or less. When continuous kneading facilities such as a twin-screw extruder, a single-screw extruder, and the like are used, kneading and extruding may be continuously performed by setting the residence time within the aforementioned range.

In the resin contained in the resin layer, the ratio of the polymer such as the alkoxysilyl group-modified product [3] is preferably 80% by weight to 100% by weight, more preferably 90% by weight to 100% by weight, and particularly preferably 95% by weight to 100% by weight. When the ratio of the polymer in the resin falls within the aforementioned range, storage elastic modulus of the resin layer can be easily confined within the above-described range.

(2.2.4. Optional Components)

The resin contained in the resin layer may further include an optional component in combination with the polymer described above. Examples of the optional component may include a plasticizer for adjusting glass transition temperature and elastic modulus; a light stabilizer for improving weather resistance and heat resistance; an ultraviolet absorber; an antioxidant; a lubricant; and an inorganic filler. As the optional component, one type thereof may be solely used, and two or more types thereof may also be used in combination at any ratio.

Examples of the method for mixing the polymer and the optional component may include a method of dissolving the optional component in an appropriate solvent, mixing the resulting mixture with the solution of the polymer and then removing the solvent to recover the resin containing the optional component; and a method of kneading the polymer with the optional component in a molten state in a kneader such as a twin-screw kneader, a roll, a bravender, an extruder, and the like.

[2.3. Properties of Resin Layer]

The storage elastic modulus of the resin layer at 100° C. is preferably less than 10 MPa, more preferably less than 7.5 MPa, and particularly preferably less than 5 MPa. When the storage elastic modulus of the resin layer in the high-temperature environment is low as described above, the resin layer can be easily heat-press bonded to an optional member. Therefore, the electroconductive film can be easily manufactured by heat-press bonding of the resin layer and the electroconductive layer. In addition, the electroconductive film can be easily bonded to an optional member by heat-press bonding. The lower limit of the storage elastic modulus of the resin layer at 100° C. is preferably 0.1 MPa or more, more preferably 0.5 MPa or more, and particularly preferably 1 MPa or more, from the viewpoint of improving heat resistance.

The bending elastic modulus of the resin layer at 25° C. is preferably 1 MPa or more, more preferably 5 MPa or more, and particularly preferably 10 MPa or more, and is preferably 500 MPa or less, more preferably 450 MPa or less, and particularly preferably 400 MPa or less. When the bending elastic modulus of the resin layer at 25° C. is equal to or more than the lower limit value of the aforementioned range, handleability of the electroconductive film can be enhanced. When the bending elastic modulus is equal to or less than the upper limit value of the aforementioned range, bending resistance of the electroconductive film can be improved.

The bending elastic modulus of the resin layer may be measured in accordance with JIS K 7117 using a universal tester (for example, the "electromechanical universal tester 5900" manufactured by Instron Corporation).

The resin layer usually has high transparency. The specific total light transmittance of the resin layer is preferably 70% or more, more preferably 80% or more, and further more preferably 90% or more. The total light transmittance may be measured in the wavelength range of 400 nm to 700 nm using an ultraviolet-visible spectrometer.

The haze of the resin layer is preferably 5% or less, more preferably 3% or less, particularly preferably 1% or less, and ideally 0%. The haze may adopt an average value calculated from haze values measured at five points by using a "turbidimeter NDH-300A" manufactured by Nippon Denshoku Industries Co., Ltd., in accordance with JIS K7361-1997.

[2.4. Method for Producing Resin Layer]

The method for producing the resin layer is not limited. For example, when the resin layer is formed of a thermoplastic resin such as a resin containing the alkoxysilyl group-modified product [3] described above, the resin layer may be produced by a molding method such as a melt molding method or a solution casting method. Among these, a melt molding method is preferable because the residue of volatile components such as a solvent in the resin layer can be suppressed. In more detail, the melt molding method may be further classified into an extrusion molding method, a press molding method, an inflation molding method, an injection molding method, a blow molding method, a stretch molding method, and the like. Among these methods, in order to obtain a resin layer having excellent mechanical strength and surface accuracy, an extrusion molding method, an inflation molding method, and a press molding method are preferable. From the viewpoint of facilitating the production of the resin layer efficiently, an extrusion molding method is particularly preferable.

[2.2. Thickness of Resin Layer]

The thickness of the resin layer is preferably 5 μm or more, more preferably 10 μm or more, and particularly preferably 15 μm or more, and is preferably 200 μm or less, more preferably 175 μm or less, and particularly preferably 150 μm or less. When the thickness of the resin layer is equal to or more than the lower limit value of the aforementioned range, mechanical strength of the electroconductive film can be increased. When the thickness is equal to or less than the upper limit value of the aforementioned range, bending resistance of the electroconductive film can be effectively increased.

[3. Electroconductive Layer]

[3.1. Surface Resistance Value of Electroconductive Layer]

The surface resistance value of the electroconductive layer is usually 1,000 Ω/sq. or less, preferably 900 Ω/sq. or less, and more preferably 800 Ω/sq. or less. When the surface resistance value of the electroconductive layer is at a such low level, high electroconductivity can be obtained. The lower limit of the surface resistance value of the electroconductive layer is not particularly limited. However, the lower limit is preferably 1 Ω/sq. or more, more preferably 2.5 Ω/sq. or more, and particularly preferably 5 Ω/sq. or more for easy production.

[3.2. Composition of Electroconductive Layer]

The electroconductive layer described above is usually formed as a layer containing a material having electroconductivity (hereinafter also referred to as a "electroconductive material" as appropriate). Examples of such an electroconductive material may include metal, an electroconductive metal oxide, an electroconductive nanowire, and an electroconductive polymer. As the electroconductive material, one type thereof may be solely used, and two or more types thereof may also be used in combination at any ratio. In particular, the electroconductive layer preferably contains at least one type of the electroconductive material selected from the group consisting of a metal, an electroconductive nanowire, and an electroconductive polymer from the viewpoint of enhancing bending resistance of the electroconductive film.

Examples of the metal may include gold, platinum, silver, and copper. Among these, silver, copper, and gold are preferable and silver is more preferable. One type of the metal may be solely used, or two or more types thereof may be used in combination at any ratio. When the electroconductive layer is formed using these types of metal, the transparent electroconductive layer can be obtained by forming the electroconductive layer in a thin linear shape. For example, the transparent electroconductive layer can be obtained by forming the electroconductive layer as a metal mesh layer formed in a lattice shape.

The electroconductive layer containing the metal may be formed, for example, by application of a composition for forming an electroconductive layer including metal particles. In this process, the electroconductive layer may be obtained as the metal mesh layer by printing the above-mentioned composition for forming an electroconductive layer in a specific lattice pattern. Further, for example, the electroconductive layer may be formed as the metal mesh layer by applying the composition for forming an electroconductive layer including a silver salt and then forming thin metal lines in a specific lattice pattern by an exposure treatment and a development treatment. Japanese Patent Application Laid-Open No. 2012-18634 A and Japanese Patent Application Laid-Open No. 2003-331654 A may be referred to for details of such electroconductive layers and their formation methods.

Examples of the electroconductive metal oxide may include ITO (indium tin oxide), IZO (indium zinc oxide), ZnO (zinc oxide), IWO (indium tungsten oxide), ITiO (indium titanium oxide), AZO (aluminum zinc oxide), GZO (gallium zinc oxide), XZO (special zinc-based oxide), and IGZO (indium gallium zinc oxide). Among these, ITO is particularly preferable from the viewpoint of light transmittance and durability. As the electroconductive metal oxide, one type thereof may be solely used, and two or more types thereof may also be used in combination at any ratio.

The electroconductive layer including the electroconductive metal oxide may be formed, for example, by a film forming method such as a vapor deposition method, a sputtering method, an ion plating method, an ion beam assisted vapor deposition method, an arc discharge plasma vapor deposition method, a thermal CVD method, a plasma CVD method, a plating method, and a combination thereof. Among these, a vapor deposition method and a sputtering method are preferable, and a sputtering method is particularly preferable. The sputtering method can form the electroconductive layer having uniform thickness and thus prevent generation of a locally thin portion in the electroconductive layer.

The electroconductive nanowire refers to an electroconductive substance that has a needle- or thread-like shape and has a diameter of the order of nanometers. The electroconductive nanowire may be linear or curved. When such electroconductive nanowires form spaces therebetween to have a mesh-like shape, a favorable electrical conduction path can be formed even with a small amount of electroconductive nanowires, thereby achieving an electroconductive layer having a small electric resistance. In addition, when the electroconductive wires have a mesh-like shape, openings are formed in the spaces of the mesh, thereby achieving an electroconductive layer having high light transmittance.

The ratio (an aspect ratio: L/d) between a thickness d and length L of the electroconductive nanowire is preferably 10 to 100,000, more preferably 50 to 100,000, and particularly preferably 100 to 10,000. Using the electroconductive nanowire having such a large aspect ratio allows the electroconductive nanowires to satisfactorily intersect with each other, thereby making it possible to obtain high electroconductivity with a small amount of the electroconductive nanowires. As a result, an electroconductive film excellent in transparency can be obtained. The term "thickness of electroconductive nanowire" used herein refers to: a diameter of the circle in a case where the electroconductive nanowire has a circular cross-section; a minor axis in a case where the electroconductive nanowire has an elliptic cross section; and a longest diagonal line in a case where the electroconductive nanowire has a polygonal cross section. The thickness and length of the electroconductive nanowire may be measured with a scanning electron microscope or a transmission electron microscope.

The thickness of the electroconductive nanowire is preferably less than 500 nm, more preferably less than 200 nm, further preferably 10 nm to 100 nm, and particularly preferably 10 nm to 50 nm. When the electroconductive nanowire has such a thickness, transparency of the electroconductive layer can be enhanced.

The length of the electroconductive nanowire is preferably 2.5 μm to 1,000 μm, more preferably 10 μm to 500 μm, and particularly preferably 20 μm to 100 μm. When the electroconductive nanowire has such a length, electroconductivity of the electroconductive layer can be enhanced.

Examples of the electroconductive nanowire may include a metal nanowire constituted by metal, and an electroconductive nanowire that includes a carbon nanotube.

As metal included in the metal nanowire, metal with high electroconductivity is preferable. Examples of the preferable metal may include gold, platinum, silver, and copper. Among these, silver, copper, and gold are preferable and silver is more preferable. Further, a material obtained by subjecting the above-mentioned metal to a plating treatment (for example, a gold plating treatment) may be used. As the above-mentioned material, one type thereof may be solely used, and two or more types thereof may also be used in combination at any ratio.

As a method for producing the metal nanowire, any appropriate method may be adopted. Examples of the method may include: a method of reducing silver nitrate in a solution; and a method of applying electric voltages or currents from a tip of a probe onto the surface of a precursor, and drawing metal nanowires at the tip of the probe to continuously form the metal nanowires. In the method in which silver nitrate is reduced in a solution, a silver nanowire may be synthesized by performing liquid-phase reduction of a silver salt such as silver nitrate in the presence of a polyol, such as ethylene glycol, and polyvinylpyrrolidone. The mass production of the silver nanowire of uniform size may be achieved according to a method described in, for example, Xia, Y. et al., Chem. Mater. (2002), 14, 4736-4745 or Xia, Y. et al., Nano letters (2003), 3(7), 955-960.

As the carbon nanotube, for example, a so-called multi-walled carbon nanotube, double-walled carbon nanotube, single walled carbon nanotube, or the like, having a diameter of about 0.3 nm to 100 nm and a length of about 0.1 μm to 20 μm, is used. Among these, the single- or double-walled carbon nanotube having a diameter of 10 nm or less and a length of 1 μm to 10 μm is preferable because of its high electroconductivity. Further, an aggregate of the carbon nanotube is preferably free from impurities such as amorphous carbon and catalytic metal. Any appropriate method may be adopted as the method for producing the carbon nanotube. Preferably, carbon nanotubes produced by an arc discharge method are used. The carbon nanotube produced by the arc discharge method has excellent crystallizability and is thus preferable.

The electroconductive layer containing the electroconductive nanowire may be produced by preparing an electroconductive nanowire dispersion liquid by dispersing the electroconductive nanowires in a solvent, and applying and drying the liquid.

Examples of the solvent included in the electroconductive nanowire dispersion liquid may include water, an alcohol-based solvent, a ketone-based solvent, an ether-based solvent, a hydrocarbon-based solvent, and an aromatic solvent. Among these, water is preferably used from the viewpoint of reducing environmental burden. As the solvent, one type thereof may be solely used, and two or more types thereof may also be used in combination at any ratio.

The concentration of the electroconductive nanowires in the electroconductive nanowire dispersion liquid is preferably 0.1% by weight to 1% by weight. When the concentration falls within this range, the electroconductive layer excellent in electroconductivity and transparency can be formed.

The electroconductive nanowire dispersion may include an optional component in combination with the electroconductive nanowire and the solvent. Examples of the optional component may include a corrosion inhibitor for preventing the corrosion of the electroconductive nanowire, a surfactant for preventing the aggregation of the electroconductive nanowire, and a binder polymer for holding the electroconductive nanowire in the electroconductive layer. As the optional component, one type thereof may be solely used, and two or more types thereof may also be used in combination at any ratio.

Examples of the method for applying the electroconductive nanowire dispersion liquid may include a spray coating method, a bar coating method, a roll coating method, a die coating method, an inkjet coating method, a screen coating method, a dip coating method, a slot-die coating method, a relief printing method, an intaglio printing method, and a gravure printing method. As the drying method, any appropriate drying method (for example, natural drying, blow drying, or heat drying) may be adopted. For example, in a case of the heat drying, a drying temperature may be set to 100° C. to 200° C. and a drying time may be set to 1 minute to 10 minutes.

The ratio of the electroconductive nanowire in the electroconductive layer is preferably 80% by weight to 100% by weight, and more preferably 85% by weight to 99% by weight, relative to the total weight of the electroconductive layer. When the ratio falls within this range, the electroconductive layer excellent in electroconductivity and light transmittance can be obtained.

Examples of the electroconductive polymer may include a polythiophene-based polymer, a polyacetylene-based polymer, a polyparaphenylene-based polymer, a polyaniline-based polymer, a polyparaphenylene vinylene-based polymer, a polypyrrole-based polymer, a polyphenylene-based polymer, and a polyester-based polymer modified with an acrylic-based polymer. Among these, a polythiophene-based polymer, a polyacetylene-based polymer, a polyparaphenylene-based polymer, a polyaniline-based polymer, a polyparaphenylene vinylene-based polymer, and a polypyrrole-based polymer are preferable.

Among these, a polythiophene-based polymer is particularly preferable. When a polythiophene-based polymer is used, an electroconductive layer having excellent transparency and chemical stability can be obtained. Specific examples of the polythiophene-based polymers may include a polythiophene; a poly(3-$C_{1-8}$ alkyl-thiophenes) such as poly(3-hexylthiophene); a poly(3,4-(cyclo)alkylenedioxythiophene) such as poly(3,4-ethylenedioxythiophene), poly(3,4-propylenedioxythiophene), and poly(3,4-(1,2-cyclohexylene)dioxythiophene); and a polythienylenevinylene. Herein, "$C_{1-8}$ alkyl" represents an alkyl group of 1 to 8 carbon atoms. As the above-mentioned electroconductive polymer, one type thereof may be solely used, and two or more types thereof may also be used in combination at any ratio.

The electroconductive polymer is preferably polymerized in the presence of an anionic polymer. For example, the polythiophene-based polymer is preferably oxidatively polymerized in the presence of an anionic polymer. As the anionic polymer, a polymer having a carboxyl group, a sulfonic acid group, or a salt thereof may be mentioned. Preferably, an anionic polymer having a sulfonic acid group, such as polystyrene sulfonic acid, is used.

The electroconductive layer containing the electroconductive polymer may be formed, for example, by applying and drying the composition for forming an electroconductive layer containing the electroconductive polymer. Japanese Patent Application Laid-Open No. 2011-175601 A may be referred to for the electroconductive layer containing the electroconductive polymer.

[3.3. Planar Shape of Electroconductive Layer]

The electroconductive layer may be formed on one surface or both surfaces of the resin layer. Further, the electroconductive layer may be formed on the entire surface of the resin layer, or on a part of the surface of the resin layer. For example, the electroconductive layer may be formed on a part of the surface of the resin layer in a manner of being patterned in a specific pattern. The pattern shape of the electroconductive layer may be set in accordance with the use application of the electroconductive film. For example, when the electroconductive film is used as a circuit board, a planar shape of the electroconductive layer may be formed in a pattern corresponding to a wiring shape of the circuit. Further, for example, when the electroconductive film is used as a sensor film for a touch panel, the planar shape of the electroconductive layer is preferably formed in a pattern that allows a satisfactory operation of the touch panel (for example, a capacitive type touch panel). Specific examples thereof may include patterns described in Japanese Translation of PCT Patent Application Publication No. 2011-511357 A, Japanese Patent Application Laid-Open No. 2010-164938 A, Japanese Patent Application Laid-Open No. 2008-310550 A, Japanese Translation of PCT Patent Application Publication No. 2003-511799 A, and Japanese Translation of PCT Patent Application Publication No. 2010-541109 A.

[3.4. Properties of Electroconductive Layer]

The electroconductive layer usually has high transparency. Thus, visible light can usually pass through the electroconductive layer. Specific transparency of the electroconductive layer may be adjusted in accordance with the use application of the electroconductive film. The specific total light transmittance of the electroconductive layer is preferably 80% or more, more preferably 90% or more, further preferably 95% or more.

[3.5. Thickness of Electroconductive Layer]

The thickness of one layer of the electroconductive layer is preferably 0.01 µm to 10 µm, more preferably 0.05 µm to 3 µm, and particularly preferably 0.1 µm to 1 µm. When the electroconductive film includes two or more electroconductive layers, thicknesses of the respective electroconductive layers may be the same as or different from each other. However, when the electroconductive layers are disposed on respective surfaces of a resin layer, thicknesses of the respective electroconductive layers are preferably the same as each other from the viewpoint of preventing deformation of the electroconductive film such as creasing and curling.

[4. Optional Layer]

The electroconductive film may include an optional layer, as necessary. Examples of the optional layer may include a support layer having a higher storage elastic modulus than that of the resin layer. The specific storage elastic modulus of the support layer at 25° C. is preferably 1,000 MPa or more, more preferably 1,500 MPa or more, and particularly 2,000 MPa or more, and is preferably 5,000 MPa or less, more preferably 4,500 MPa or less, and particularly preferably 4,000 MPa or less. When the support layer having such a large storage elastic modulus is included, handleability upon processing, conveying, and installing the electroconductive film can be enhanced.

Examples of the support layer may include a layer formed of a resin having a high storage elastic modulus. The resin contained in the support layer may include a polymer and, as necessary, an optional component. Examples of the polymer may include a polyolefin such as polyethylene and polypropylene; a polyester such as polyethylene terephthalate, and polybutylene terephthalate; a polyarylene sulfide such as polyphenylene sulfide; a polyvinyl alcohol; a polycarbonate; a polyarylate; a cellulose ester polymer, a polyethersulfone; a polysulfone; a polyallylsulfone; a polyvinyl chloride; a polymer containing an alicyclic structure, such as a norbornene-based polymer; and a rod-like liquid crystal polymer. As these polymers, one type of these polymers may be solely used, and two or more types thereof may also be used in combination at any ratio. The polymer may be a homopolymer or a copolymer. Among these, an alicyclic structure-containing polymer is preferable because of its excellent mechanical properties, heat resistance, transparency, low hygroscopicity, size stability, and light weight properties.

The thickness of the support layer is preferably 10 µm or more, more preferably 13 µm or more, and particularly preferably 15 µm or more, and is preferably 60 µm or less, more preferably 58 µm or less, and particularly preferably 55 µm or less. When the thickness of the support layer is equal to or more than the lower limit value of the aforementioned range, handleability of the electroconductive film can be enhanced. When the thickness is equal to or less than the upper limit value of the aforementioned range, thickness of the electroconductive film can be reduced.

Further examples of the optional layer may include a hard coat layer, an index matching layer, an adhesive layer, a phase difference layer, a polarizer layer, and an optical compensation layer.

[5. Properties and Thickness of Electroconductive Film]

The electroconductive film is excellent in bending resistance. Thus, the electroconductive layer is less prone to cause lowering of the electroconductivity when the electroconductive film is bent. Further, the electroconductive layer is less prone to cause appearance change such as whitening when the electroconductive film is bent. The mechanism whereby such excellent bending resistance is obtainable is speculated as described below. However, the technical scope of the present invention is not limited to the mechanism described below.

The resin layer included in the electroconductive film of the present invention has the storage elastic modulus within an appropriate range and thus is excellent in flexibility. Accordingly, when the electroconductive film is bent, it can be easily deformed to absorb stress caused by the bending. Thus, the electroconductive layer is less prone to cause breakage by the stress caused by the bending. As a result, the electroconductive layer is less prone to cause increase in a surface resistance value when the electroconductive film is bent, thus making it possible to prevent reduction in the electroconductivity.

Further, since the resin layer has the storage elastic modulus within an appropriate range, the electroconductive film is less prone to cause breakage of the resin layer and is also less prone to cause peeling of the resin layer from the electroconductive layer when the electroconductive film is bent. Accordingly, the electroconductive film is less prone to cause a minute gap generated by the breakage or peeling described above. Thus, the electroconductive film is less prone to cause an increase in haze at a bending portion, leading to prevention of appearance change such as whitening. Further, the resin layer, which has excellent elasticity, easily restores its original shape even if bent, thus a bending mark is less prone to be formed.

The electroconductive film includes the resin layer as a layer for supporting the electroconductive layer. Thus, the electroconductive film is usually superior to an electroconductive glass in impact resistance and processability. Further, the electroconductive film is usually lighter than the electroconductive glass.

The total light transmittance of the electroconductive film is preferably 70% or more, more preferably 80% or more, and further preferably 90% or more.

The haze of the electroconductive film is preferably 5% or less, more preferably 3% or less, particularly preferably 1% or less, and ideally 0%.

The thickness of the electroconductive film is preferably 5 µm or more, more preferably 7.5 µm or more, and particularly preferably 10 µm or more, and is preferably 200 µm or less, more preferably 175 µm or less, and particularly preferably 150 µm or less. When the thickness of the electroconductive film is equal to or more than the lower limit value of the aforementioned range, mechanical strength of the electroconductive film can be enhanced. When the thickness is equal to or less than the upper limit value of the aforementioned range, the thickness of the electroconductive film can be reduced.

[6. Method for Producing Electroconductive Film]

The electroconductive film may be produced, for example, by a production method that includes a step of producing the resin layer and a step of disposing the electroconductive layer on the resin layer described above. The electroconductive layer may be formed on the resin layer using a material of the electroconductive layer. Alternatively, the electroconductive layer may be formed on an appropriate substrate and then the electroconductive layer thus formed may be bonded to the resin layer, to thereby dispose the electroconductive layer on the resin layer. For example, when the electroconductive layer is formed by a sputtering method with an electroconductive metal oxide, the resin layer may possibly be damaged depending on a film forming conditions during the sputtering. In such a case, production of the electroconductive film by forming the electroconductive layer on a substrate capable of withstanding the sputtering and then bonding the electroconductive layer to the resin layer can achieve production of the electroconductive film while avoiding damage to the resin layer.

[7. Examples of Layer Configuration]

The layer configuration of the electroconductive film of the present invention may be freely set as long as the electroconductive film includes the resin layer and the electroconductive layer. Examples of the preferable layer configuration of the electroconductive film will be described below with reference to the drawings.

FIG. 1 is a cross-sectional view schematically illustrating an electroconductive film 10 as a first embodiment of the present invention. As illustrated in FIG. 1, the electroconductive film 10 according to the first embodiment is a film of a double-layer structure including only a resin layer 110 and an electroconductive layer 120. This electroconductive film 10 includes the electroconductive layer 120 having a small surface resistance value and is thus excellent in electroconductivity. Further, the electroconductive film 10 includes the resin layer 110 having the storage elastic modulus within an appropriate range and is thus excellent in bending resistance. As a result, the electroconductive film 10 is less prone to cause reduction in the electroconductivity and appearance change thereof even when the electroconductive film 10 is bent.

Figure 2:
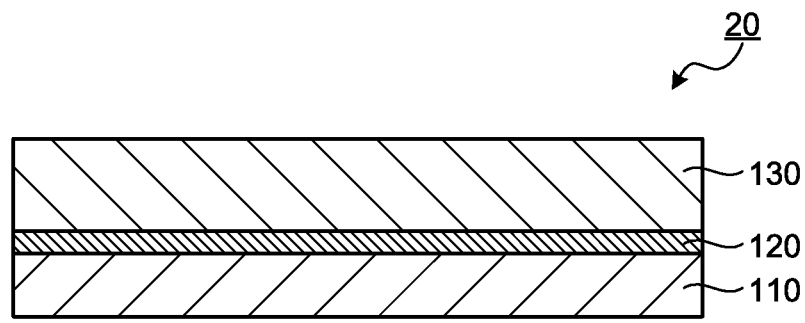
FIG. 2 is a cross-sectional view schematically illustrating an electroconductive film as a second embodiment of the present invention.
Figure 3:
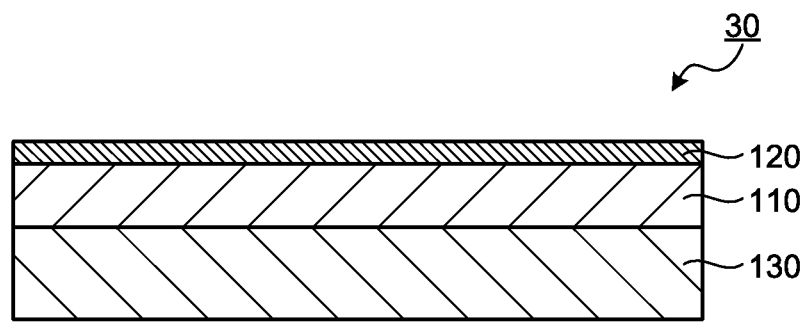
FIG. 3 is a cross-sectional view schematically illustrating an electroconductive film as a third embodiment of the present invention.

FIG. 2 is a cross-sectional view schematically illustrating an electroconductive film 20 as a second embodiment of the present invention. Further, FIG. 3 is a cross-sectional view schematically illustrating an electroconductive film 30 as a third embodiment of the present invention. As illustrated in FIG. 2 and FIG. 3, the electroconductive films 20 and 30 according to the second and third embodiments may include a support layer 130 in combination with the resin layer 110 and the electroconductive layer 120. In such a case, each layer may be disposed in any order. As exemplified by the electroconductive film 20 illustrated in FIG. 2, the resin layer 110, the electroconductive layer 120, and the support layer 130 may be disposed in this order. As exemplified by the electroconductive film 30 illustrated in FIG. 3, the support layer 130, the resin layer 110, and the electroconductive layer 120 may be disposed in this order. The electroconductive films 20 and 30, which include the support layer 130 in this manner, can also exhibit improved handleability in addition to the same advantageous effects as in the first embodiment.

Figure 4:
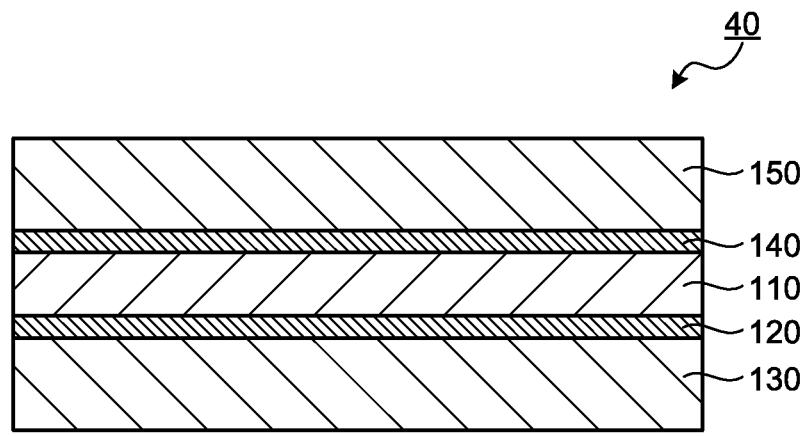
FIG. 4 is a cross-sectional view schematically illustrating an electroconductive film as a fourth embodiment of the present invention.

FIG. 4 is a cross-sectional view schematically illustrating an electroconductive film 40 as a fourth embodiment of the present invention. The electroconductive film may include any number of layers. As exemplified by the electroconductive film 40 according to the fourth embodiment illustrated in FIG. 4, the support layer 130, the electroconductive layer 120, the resin layer 110, an electroconductive layer 140, and a support layer 150 may be disposed in this order. In this case, materials, shapes, and thicknesses of the electroconductive layers 120 and 140 may be the same as or different from each other. For example, a pattern shape of one electroconductive layer 120 may be different from a pattern shape of the other electroconductive layer 140. Further, materials, shapes, and thicknesses of the support layers 130 and 150 may be the same as or different from each other. The same advantageous effects as in the first to third embodiments can be obtained also when a plurality of each of any optional layers, such as the resin layer, the electroconductive layer, and the support layer, are disposed.

[8. Use of Electroconductive Film]

The use application of the electroconductive film is not particularly limited. Examples of the preferable use application of the electroconductive film may include: a sensor film for a touch panel such as a resistance type touch panel and a capacitive type touch panel; an electrode for a light emitting element such as an organic EL element; and the like.

EXAMPLE

Hereinafter, the present invention will be specifically described by illustrating Examples. However, the present invention is not limited to the Examples described below. The present invention may be optionally modified for implementation without departing from the scope of claims of the present invention and its equivalents.

In the following description, "%" and "part" representing quantity are on the basis of weight, unless otherwise specified. The operation described below was performed under the conditions of normal temperature and normal pressure in the atmospheric, unless otherwise specified.

In the following description "PEDOT" represents poly(3,4-ethylenedioxythiophene), "PSS" represents a polystyrene sulfonic acid, and "PEDOT/PSS" represents poly(3,4-ethylenedioxythiophene) doped with a polystyrene sulfonic acid, unless otherwise specified.

[Evaluation Methods]

[Method for Measuring Storage Elastic Modulus]

The storage elastic modulus of the resin layer was measured by using a dynamic viscoelasticity apparatus ("DMS6100" manufactured by Seiko Instruments Inc.) under a condition of a frequency of 1 Hz.

[Method for Measuring Bending Elastic Modulus]

The bending elastic modulus of the resin layer was measured by using an electromechanical universal tester ("5900" manufactured by Instron Corporation) in accordance with JIS K 7117.

[Method for Measuring Surface Resistance Value]

The surface resistance value of the electroconductive layer of the transparent electroconductive film was measured by using a non-contact type resistance measurement instrument ("NC-10" manufactured by Napson).

[Method for Evaluating Change in Surface Resistance Value in Folding-Back Test]

The transparent electroconductive film was subjected to a folding-back test. In this folding-back test, the transparent electroconductive film was subjected to 10,000 times of folding-back operation with a curvature radius of 5 mm by using a bending test machine ("TCDM111LH" manufactured by Yuasa System Co., Ltd.). Then, the surface resistance value of the electroconductive layer of the transparent electroconductive film was measured. Finally, a rising rate of the surface resistance value in the folding-back test was calculated by the following formula (X) with a surface resistance value $R_0$ before the folding-back test and a surface resistance value $R_i$ after the folding-back test.

$$\text{Rising rate of surface resistance value}[\%] = \{(R_i - R_0)/R_0\} \times 100 \quad (X)$$

The rising rate of the surface resistance value thus obtained was evaluated by the following criteria. In this evaluation, smaller rising rate of the surface resistance value in the folding-back test means better bending resistance of the transparent electroconductive film.

A: The rising rate of the surface resistance value before and after the bending test is less than 5%.

B: The rising rate of the surface resistance value before and after the bending test is 5% or more and less than 10%.

C: The rising rate of the surface resistance value before and after the bending test is 10% or more.

[Method for Evaluating Appearance after Folding-Back Test]

The transparent electroconductive film having been subjected to the folding-back test described above was visually observed and evaluated by the following criteria. Smaller change in appearance in the folding-back test means better bending resistance of the transparent electroconductive film.

A: There is no appearance change at all at the folding-back site.

B: A folding-back mark is slightly visible at the folding-back site.

C: The folding-back site is whitened or exhibits a clearly visible folding-back mark.

D: The folding-back site is whitened and exhibits a clearly visible folding-back mark.

Production Example 1

Production of Resin Layer (1)

A hydrogenated product (ia1) of a triblock copolymer (a weight-average molecular weight Mw of 48,200; a molecular weight distribution Mw/Mn of 1.04; a hydrogenation rate of carbon-carbon unsaturated bonds of a main chain, a side chain, and an aromatic ring of approximately equal to 100%) was produced by polymerizing 25 parts of styrene, 50 parts of isoprene, and 25 parts of styrene in this order with reference to a method described in International Publication No. 2014/077267. Further, a pellet of an alkoxysilyl modified product (ia1-s) of the hydrogenated product of the triblock copolymer was produced by bonding 1.8 parts of vinyltrimethoxysilane to 100 parts of the hydrogenated product (ia1) of the triblock copolymer described above with reference to a method described in International Publication No. 2014/077267 describe above.

A twin-screw extruder equipped with a side feeder and a T-die having a width of 400 mm ("TEM-37B" manufactured by Toshiba Machine Co., Ltd.) and a sheet take-up device equipped with a casting roll and a releasable film supplying device were used to produce a resin layer (1) by the following method.

The alkoxysilyl modified product (ia1-s) was supplied to the twin-screw extruder. A hydrogenated polybutene ("PARLEAM (registered trademark) 24" manufactured by NOF Corp.) was continuously supplied from the side feeder at a rate such that the amount thereof was 15 parts per 100 parts of the alkoxysilyl modified product (ia1-s), to obtain a molten resin containing the alkoxysilyl modified product (ia1-s) described above and the hydrogenated polybutene. Then, this molten resin was extruded from the T-die on the casting roll to be molded in a film shape. The extrusion was performed under molding conditions of a molten resin temperature of 180° C., a T-die temperature of 180° C., and a casting roll temperature of 40° C. The molten resin thus extruded was cooled by the casting roll to obtain the resin layer (1) having a thickness of 50 µm.

A PET film (a thickness of 50 µm) for releasing was supplied to one surface of the resin layer (1) extruded on the casting roll, and the resin layer (1) and the PET film were wound up into a roll shape and collected in a stacked manner. In this manner, a roll of a multilayer film including the resin layer (1) and the PET film was obtained.

The multilayer film was unwound from the roll, and the PET film was peeled off to obtain the resin layer (1). The storage elastic modulus of the resin layer (1) was measured at 25° C., and found to be 143 MPa. Further, the bending elastic modulus of the resin layer (1) was measured at 25° C., and found to be 437 MPa.

Production Example 2

Production of Resin Layer (2)

A pellet of a hydrogenated product (ia2) of a triblock copolymer (a weight-average molecular weight Mw of 48,200; a molecular weight distribution Mw/Mn of 1.04; a hydrogenation rate of carbon-carbon unsaturated bonds of a main chain, a side chain, and an aromatic ring of approximately equal to 100%) was produced by polymerizing 25 parts of styrene, 50 parts of isoprene, and 25 parts of styrene in this order with reference to a method described in WO 2011/096389.

A twin-screw extruder equipped with a T-die having a width of 400 mm ("TEM-37B" manufactured by Toshiba Machine Co., Ltd.) and a sheet take-up device equipped with a casting roll and a releasable film supplying device were used to produce a resin layer (2) under the following conditions.

The hydrogenated product (ia2) of the triblock copolymer was supplied to the twin-screw extruder and melted to obtain a molten resin. Then, this molten resin was extruded from the T-die on the casting roll to be molded in a film shape. The extrusion was performed under molding conditions of the molten resin temperature of 180° C., the T-die temperature of 180° C., and the casting roll temperature of 40° C. The molten resin thus extruded was cooled by the casting roll to obtain the resin layer (2) having a thickness of 50 µm.

A PET film (a thickness of 50 µm) for releasing was supplied to one surface of the resin layer (2) extruded on the casting roll, and the resin layer (2) and the PET film were wound onto a roll and collected in a stacked manner. In this manner, a roll of a multilayer film including the resin layer (2) and the PET film was obtained.

The multilayer film was unwound from the roll, and the PET film was peeled off to obtain the resin layer (2). The storage elastic modulus of the resin layer (2) was measured at 25° C., and found to be 111 MPa. Further, the bending elastic modulus of the resin layer (2) was measured at 25° C., and found to be 760 MPa.

Production Example 3

Production of Resin Layer (3)

A pellet of a hydrogenated product (ia3) of a triblock copolymer (a weight-average molecular weight Mw of 48,200; a molecular weight distribution Mw/Mn of 1.04; a hydrogenation rate of carbon-carbon unsaturated bonds of a main chain, a side chain, and an aromatic ring of approximately equal to 100%) was produced by polymerizing 30 parts of styrene, 40 parts of isoprene, and 30 parts of styrene in this order with reference to a method described in WO 2011/096389.

A twin-screw extruder equipped with a T-die having a width of 400 mm ("TEM-37B" manufactured by Toshiba Machine Co., Ltd.) and a sheet take-up device equipped with a casting roll and a releasable film supplying device were used to produce a resin layer (3) under the following conditions.

The hydrogenated product (ia3) of the triblock copolymer was supplied to the twin-screw extruder and melted to obtain a molten resin. Then, this molten resin was extruded from a T-die onto a casting roll to be molded into a film shape. The extrusion was performed under molding conditions of the molten resin temperature of 180° C., the T-die temperature of 180° C., and the casting roll temperature of 40° C. The molten resin thus extruded was cooled by the casting roll to obtain the resin layer (3) having a thickness of 50 μm.

A PET film (a thickness of 50 μm) for releasing was supplied to one surface of the resin layer (3) extruded on the casting roll, and the resin layer (3) and the PET film were wound onto a roll and collected in a stacked manner. In this manner, a roll of a multilayer film including the resin layer (3) and the PET film was obtained.

The multilayer film was unwound from the roll, and the PET film was peeled off to obtain the resin layer (3). The storage elastic modulus of the resin layer (3) was measured at 25° C., and found to be 800 MPa. Further, the bending elastic modulus of the resin layer (3) was measured at 25° C., and found to be 1260 MPa.

Example 1

Example of Using Electroconductive Polymer

A coating composition serving as the composition for forming an electroconductive layer was produced by adding 10 g of PEDOT/PSS ("Clevios PH1000" manufactured by Heraeus Holding), 0.8 g of an acrylic resin ("JURYMER AT-510" manufactured by Toagosei Co., Ltd., a solid content of 30%), and 3 g of ethylene glycol (manufactured by Wako Pure Chemical Industries, Ltd) to 100 g of an industrial modified alcohol ("SOLMIX AP-7" manufactured by Japan Alcohol Trading Co., Ltd.) and stirring the mixture.

The coating composition was applied onto the resin layer (1) produced in Production Example 1 using a bar coater (manufactured by Yasuda Seiki Seisakusho, Ltd.) and subjected to a heating treatment at 100° C. for 1 min using a dryer. In this manner, an electroconductive layer having a thickness of 1 μm was formed on the resin layer (1), thereby obtaining a transparent electroconductive film (a).

The surface resistance value of the electroconductive layer of the transparent electroconductive film (a) thus obtained was measured, and found to be 450 Ω/sq. This transparent electroconductive film (a) was evaluated by the methods described above.

Example 2

Example of Using Silver Nanowire

As an electroconductive nanowire dispersion liquid, a dispersion liquid containing a silver nanowire ("ClearOhm" manufactured by Cambrios Technologies Corp.) was prepared.

The dispersion liquid described above was applied onto the resin layer (1) produced in Production Example 1 using a bar coater and dried at 80° C. In this manner, an electroconductive layer having a thickness of 1 μm was formed on the resin layer (1), thereby obtaining a transparent electroconductive film (b).

The surface resistance value of the electroconductive layer of the transparent electroconductive film (b) thus obtained was measured, and found to be 750 Ω/sq. This transparent electroconductive film (b) was evaluated by the methods described above.

Example 3

Example of Using CNT (Production of Carbon Nanotube by Super-Growth Method)

A carbon nanotube was produced by a super-growth method according to the description in International Publication No. 2006/011655. Hereinafter, this carbon nanotube is also referred to as "SGCNT" as appropriate. The SGCNT thus obtained had a BET specific surface area of 804 $m^2/g$ measured by nitrogen adsorption, a BET specific surface area of 2.4 $m^2/g$ measured by water vapor adsorption, a mass density of 0.03 $g/cm^3$, and a micropore volume of 0.44 mL/g. Further, as a result of measuring diameters of 100 randomly selected SGCNT by using a transmission electron microscope, an average diameter (Av) was 3.3 nm, a value (3σ) obtained by multiplying a sample standard deviation (σ) of the diameters by 3 was 1.9 nm, (3σ/Av) was 0.58, and an average length was 500 μm. Further, the SGCNT thus obtained mainly included a single walled carbon nanotube (a single walled CNT).

(Production of Electroconductive Film)

0.015 g of SGCNT and 0.030 g of a copolymer of sodium styrenesulfonate/disodium maleate (a molar ratio of monomers of 1:1, an average polymerization degree of 20,000) as a dispersant were weighed and placed in a 30 ml sample bottle. After adding 8 g of ion exchange water and 2 g of ethanol to the sample bottle, a mixture was adjusted to pH 2.5 by using nitric acid. After that, the mixture was treated with a bath-type ultrasonic disperser for 2 hours to obtain a CNT dispersion liquid as an electroconductive nanowire dispersion liquid.

The CNT dispersion liquid described above was applied onto the resin layer (1) produced in Production Example 1 using a bar coater and dried. In this manner, an electroconductive layer having a thickness of 1.5 μm was formed on the resin layer (1), thereby obtaining a transparent electroconductive film (c).

The surface resistance value of the electroconductive layer of the transparent electroconductive film (c) thus obtained was measured, and found to be 1,000 Ω/sq. This transparent electroconductive film (c) was evaluated by the methods described above.

Example 4

Example of Using Silver Particle

As a composition for forming an electroconductive layer containing silver nanoparticles as metal particles, a silver ink ("Silver Nanoparticle Ink" manufactured by Sigma-Aldrich Japan) was prepared.

The silver ink described above was applied onto the resin layer (1) produced in Production Example 1 using a bar coater and dried at 120° C. for 60 seconds. In this manner, an electroconductive layer having a thickness of 0.7 μm was formed on the resin layer (1), thereby obtaining a transparent electroconductive film (d).

The surface resistance value of the electroconductive layer of the transparent electroconductive film (d) thus obtained was measured, and found to be 300 Ω/sq. This transparent electroconductive film (d) was evaluated by the methods described above.

Example 5

Example of Using Electroconductive Metal Oxide

As a substrate, a cycloolefin polymer film ("ZEONOR film ZF16-50" manufactured by ZEON Corporation, hereinafter also referred to as a "COP film") having a thickness of 50 μm was prepared. An ITO layer was formed as an electroconductive layer on the COP film described above by performing sputtering with the use of a film-winding type magnetron sputtering device to obtain a multilayer film including the COP film and the ITO layer. The above-mentioned sputtering was performed using a material obtained by sintering tin oxide and indium oxide as a target under conditions of an argon (Ar) flow rate of 150 sccm, an oxygen ($O_2$) flow rate of 10 sccm, an output of 4.0 kW, a vacuum degree of 0.3 Pa, and a film conveyance speed of 0.5 m/min. The term "sccm" used herein refers to a unit of a gas flow rate, representing an amount of gas that flows per minute, the amount being represented by the volume ($cm^3$) of the gas at 25° C. and 1 atm.

A surface of the multilayer film thus obtained on an ITO layer side and the resin layer (1) produced in Production Example 1 were bonded together by a heat lamination method (a temperature of 100° C., a conveyance speed of 1 m/min, a pressure of 0.4 MPa). After that, the COP film was peeled off to obtain a transparent electroconductive film (e) including the resin layer (1) and the ITO layer having a thickness of 30 nm.

The surface resistance value of the ITO layer of the transparent electroconductive film (e) thus obtained was measured, and found to be 150 Ω/sq. This transparent electroconductive film (e) was evaluated by the methods described above.

Example 6

A transparent electroconductive film (f) was produced by the same operation as that in Example 1 except that the resin layer (2) produced in Production Example 2 was used instead of the resin layer (1).

The surface resistance value of the electroconductive layer of the transparent electroconductive film (f) thus obtained was measured, and found to be 450 Ω/sq. This transparent electroconductive film (f) was evaluated by the methods described above.

Example 7

A transparent electroconductive film (g) was produced by the same operation as that in Example 5 except that the resin layer (3) produced in Production Example 3 was used instead of the resin layer (1).

The surface resistance value of the electroconductive layer of the transparent electroconductive film (g) thus obtained was measured, and found to be 150 Ω/sq. This transparent electroconductive film (g) was evaluated by the methods described above.

The haze of the obtained transparent electroconductive film (g) was measured on the basis of JIS K 7136 using a haze meter ("NDH-4000" manufactured by Nippon Denshoku Industries Co., Ltd.), and found to be 0.5%.

Comparative Example 1

A transparent electroconductive film (h) was produced by the same operation as that in Example 1 except that a polyethylene terephthalate film ("U-34" manufactured by Toray Co., Ltd., a thickness of 50 μm, a storage elastic modulus at 25° C. of 4000 MPa) was used instead of the resin layer (1).

The surface resistance value of the electroconductive layer of the transparent electroconductive film (h) thus obtained was measured, and found to be 450 Ω/sq. This transparent electroconductive film (h) was evaluated by the methods described above.

Comparative Example 2

A transparent electroconductive film (i) was produced by the same operation as that in Example 1 except that a polyethylene naphthalate film ("Q65HA" manufactured by DuPont Teijin Films Co., Ltd., a thickness of 50 μm, a storage elastic modulus at 25° C. of 5000 MPa) was used instead of the resin layer (1).

The surface resistance value of the electroconductive layer of the transparent electroconductive film (i) thus obtained was measured, and found to be 450 Ω/sq. This transparent electroconductive film (i) was evaluated by the methods described above.

Comparative Example 3

A transparent electroconductive film (j) was produced by the same operation as that in Example 1 except that a polycarbonate film ("Pureace" manufactured by DuPont Teijin Films Co., Ltd., a thickness of 50 μm, a storage elastic modulus at 25° C. of 1300 MPa) was used instead of the resin layer (1).

The surface resistance value of the electroconductive layer of the transparent electroconductive film (j) thus obtained was measured, and found to be 450 Ω/sq. This transparent electroconductive film (j) was evaluated by the methods described above.

Comparative Example 4

A tackiness film that includes a releasable substrate and a layer of a pressure-sensitive tackiness agent ("CS9621" manufactured by Nitto Denko Corp.) disposed on the releasable substrate (a tackiness film manufactured by Nitto Denko Corp., a thickness of the tackiness agent layer of 20 μm, a storage elastic modulus of the tackiness agent layer at 25° C. of 1 Mpa, a thickness of the releasable substrate plate of 50 μm) was prepared.

The coating composition produced in Example 1 was applied onto the tackiness agent layer of the tackiness film described above using a bar coater (manufactured by Yasuda Seiki Seisakusho, Ltd.) and subjected to a heating treatment at 100° C. for 1 min by using a dryer. In this manner, an electroconductive layer was formed on the tackiness agent layer. After that, the releasable substrate was peeled off to obtain a transparent electroconductive film (k) including the tackiness agent layer and the electroconductive layer.

The surface resistance value of the electroconductive layer of the transparent electroconductive film (k) thus obtained was measured, and found to be 450 Ω/sq. This transparent electroconductive film (k) was evaluated by the methods described above.

[Results]

Results of Examples and Comparative Examples described above are shown in the following table. Meanings of abbreviations in the following table are as follows.

PET: Polyethylene terephthalate film
PEN: Polyethylene naphthalate film
PC: Polycarbonate film
PSA: Pressure-sensitive tackiness agent layer
Storage elastic modulus: Storage elastic modulus of resin layer at 25° C.
Bending elastic modulus: Bending elastic modulus of resin layer at 25° C.
CNT: Carbon nanotube

TABLE 1

Results of Examples and Comparative Examples

| | Resin layer | | | Electroconductive layer | | Evaluation result | |
|---|---|---|---|---|---|---|---|
| | Type | Storage elastic modulus [MPa] | Bending elastic modulus [MPa] | Type | Surface resistance value [Ω/sq.] | Resistance rising rate | Appearance change |
| Ex. 1 | Resin layer (1) | 143 | 437 | PEDOT | 450 | A | A |
| Ex. 2 | Resin layer (1) | 143 | 437 | Silver nanowire | 750 | A | A |
| Ex. 3 | Resin layer (1) | 143 | 437 | CNT | 1000 | A | A |
| Ex. 4 | Resin layer (1) | 143 | 437 | Silver ink | 300 | A | A |
| Ex. 5 | Resin layer (1) | 143 | 437 | ITO | 150 | A | A |
| Ex. 6 | Resin layer (2) | 111 | 760 | PEDOT | 450 | A | B |
| Ex. 7 | Resin layer (3) | 800 | 1260 | ITO | 150 | A | B |
| Comp. Ex. 1 | PET | 4000 | 3070 | PEDOT | 450 | C | D |
| Comp. Ex. 2 | PEN | 5000 | 2200 | PEDOT | 450 | C | D |
| Comp. Ex. 3 | PC | 1300 | 2180 | PEDOT | 450 | C | D |
| Comp. Ex. 4 | PSA | 1 | 1 | PEDOT | 450 | A | C |

Discussion

As shown in Examples and Comparative Examples described above, the electroconductive film obtained by combining the resin layer having a storage elastic modulus within the specific range at 25° C. and the electroconductive layer having a surface resistance value within the specific range at 25° C. has low tendency to increase the surface resistance value of the electroconductive layer and also has low tendency to cause a change in appearance such as whitening when the electroconductive film is bent. Thus, the results in Examples and Comparative Examples described above could confirm that, according to the present invention, it became possible to achieve the electroconductive film excellent in both electroconductivity and bending resistance.

Reference Example 1

(Production of Resin Layer A)

46.15 g of the pellet of the alkoxysilyl modified product (ia1-s) of the hydrogenated product of the triblock copolymer obtained in Production Example 1 and 13.85 g of hydrogenated polybutene ("10SH" manufactured by NOF Corp.) were dissolved in 140 g of cyclohexane, to obtain a resin solution.

The resin solution thus obtained was applied onto a releasable PET film ("MRV38" manufactured by Mitsubishi Plastics Industries, Ltd.) having a thickness of 50 μm by using a slit coater and dried at 120° C. for 3 minutes to form a resin layer A having a thickness of 20 μm on the releasable PET film. After that, the releasable PET film was peeled off to obtain the resin layer A having a thickness of 20 μm as a single-layer film.

(Evaluation 1 of Bending Resistance of Resin Layer A in Folding-Back Test)

The resin layer A was subjected to 200,000 times of folding-back operation with a curvature radius of 2.5 mm by using a bending test machine ("TCDM111LHA" manufactured by Yuasa System Co., Ltd.).

After that, the resin layer A was visually observed. As a result of the observation, it was confirmed that there was no appearance change at all at a folding-back site.

(Evaluation 2 of Bending Resistance of Resin Layer A in Folding-Back Test)

The resin layer A was subjected to 200,000 times of folding-back operation with an interval of 4 mm by using a bending test machine ("DLDM111LHA" manufactured by Yuasa System Co., Ltd.).

After that, the resin layer A was visually observed. As a result of the observation, it was confirmed that there was no appearance change at all at a folding-back site.

REFERENCE SIGN LIST 10,20,30 and 40 electroconductive film
110 resin layer
120 and 140 electroconductive layer
130 and 150 support layer

The invention claimed is:

1. An electroconductive film comprising a resin layer formed of a thermoplastic resin and an electroconductive layer, wherein
the resin layer has a storage elastic modulus at 25° C. of more than 10 MPa and less than 1,000 MPa,
the electroconductive layer has a surface resistance value of 1,000 Ω/sq. or less,
the electroconductive layer has a thickness of 10 μm or less,
the electroconductive film has a total light transmittance of 70% or more,
the resin layer contains an alkoxysilyl group-modified product [3] of a hydrogenated product of a block copolymer,
the alkoxysilyl group-modified product [3] is an alkoxysilyl group-modified product of a hydrogenated product [2] that is a product of hydrogenation of carbon-carbon unsaturated bonds in a main chain and a side chain and carbon-carbon unsaturated bonds in an aromatic ring of a block copolymer [1],
the block copolymer [1] includes two or more polymer blocks [A] per one molecule of the block copolymer [1] and one or more polymer blocks [B] per one molecule of the block copolymer [1], the polymer block [A] containing an aromatic vinyl compound unit, the polymer block [B] containing a chain conjugated diene compound unit, and
a ratio (wA/wB) of a weight fraction wA of the polymer blocks [A] in the entire block copolymer [1] and a weight fraction wB of the polymer blocks [B] in the entire block copolymer [1] is in a range of 20/80 to 60/40.

2. The electroconductive film according to claim 1, wherein the electroconductive layer contains at least one electroconductive material selected from the group consisting of a metal, an electroconductive nanowire, and an electroconductive polymer.

3. An electroconductive film comprising a resin layer formed of a thermoplastic resin and an electroconductive layer, wherein
the resin layer has a storage elastic modulus at 25° C. of more than 10 MPa and less than 1,000 MPa,
the resin layer has a bending elastic modulus at 25° C. of 500 MPa or less
the electroconductive layer has a surface resistance value of 1,000 Ω/sq. or less,
the electroconductive layer has a thickness of 10 μm or less,
the electroconductive film has a total light transmittance of 70% or more,
the resin layer contains an alkoxysilyl group-modified product [3] of a hydrogenated product of a block copolymer,
the alkoxysilyl group-modified product [3] is an alkoxysilyl group-modified product of a hydrogenated product [2] that is a product of hydrogenation of carbon-carbon unsaturated bonds in a main chain and a side chain and carbon-carbon unsaturated bonds in an aromatic ring of a block copolymer [1],
the block copolymer [1] includes two or more polymer blocks [A] per one molecule of the block copolymer [1] and one or more polymer blocks [B] per one molecule of the block copolymer [1], the polymer block [A] containing an aromatic vinyl compound unit, the polymer block [B] containing a chain conjugated diene compound unit, and
a ratio (wA/wB) of a weight fraction wA of the polymer blocks [A] in the entire block copolymer [1] and a weight fraction wB of the polymer blocks [B] in the entire block copolymer [1] is in a range of 20/80 to 60/40.

4. The electroconductive film according to claim 3, wherein the electroconductive layer contains at least one electroconductive material selected from the group consisting of a metal, an electroconductive nanowire, and an electroconductive polymer.

\* \* \* \* \*